United States Patent [19]
Meissinger et al.

[11] Patent Number: 6,059,235
[45] Date of Patent: May 9, 2000

[54] INTERPLANETARY TRANSFER METHOD

[75] Inventors: Hans F. Meissinger, Los Angeles; James R. Wertz, Torrance; Simon D. Dawson, Redondo Beach, all of Calif.

[73] Assignee: Microcosm, Inc., El Segundo, Calif.

[21] Appl. No.: 08/883,468

[22] Filed: Jun. 26, 1997

[51] Int. Cl.$^7$ ..................................................... B64G 1/40
[52] U.S. Cl. ......................... 244/172; 244/63; 244/158 R
[58] Field of Search ............................... 244/172, 158 R, 244/164, 63

[56] References Cited

U.S. PATENT DOCUMENTS

| | | | |
|---|---|---|---|
| 4,664,343 | 5/1987 | Lofts et al. | 244/158 R |
| 4,796,839 | 1/1989 | Davis | 244/158 R |
| 4,896,848 | 1/1990 | Ballard et al. | 244/158 R |
| 5,186,419 | 2/1993 | Scott | 244/158 R |
| 5,350,137 | 9/1994 | Henley | 244/158 R |
| 5,765,784 | 6/1998 | Lapins | 244/158 R |

FOREIGN PATENT DOCUMENTS

| | | |
|---|---|---|
| 3002-551 | 7/1981 | Germany . |
| WO 92/21561 | 12/1992 | WIPO . |

OTHER PUBLICATIONS

"Space Technology", edited by Howard Seifert, 1959, pp. 8–63 to 8–73.

*Primary Examiner*—J. Woodrow Eldred
*Attorney, Agent, or Firm*—Noel F. Heal

[57] ABSTRACT

A method for increasing the payload that can be delivered by a given launch vehicle to a selected target in an interplanetary space mission, without increasing the transfer time to reach the target. In accordance with the disclosed method, a conventional multi-stage launch vehicle is used to accelerate a payload spacecraft to near earth's escape velocity. Then the spacecraft is separated from the upper stage of the launch vehicle and is further accelerated by applying a velocity impulse with an onboard propulsion system into a transfer trajectory that takes the spacecraft to the target planet. Because the upper stage of the launch vehicle is not accelerated into the same transfer trajectory, a larger payload mass can be delivered to the target planet without increasing the transfer time. Alternatively, the transfer time can be reduced without decreasing the payload mass or changing the launch vehicle configuration. In another disclosed embodiment of the method, multiple spacecraft are launched by the same launch vehicle, placed in separate trajectories to one or more destinations, and then separately placed in different final trajectories, such as different orbits around the target planet. In yet another disclosed embodiment of the method, an additional velocity impulse is provided by onboard propulsion as the spacecraft nears an intermediate target planet, to reduce transfer time in a mission that includes a powered planetary swing-by.

7 Claims, 5 Drawing Sheets

INTERPLANETARY TRANSFER METHOD

BACKGROUND OF THE INVENTION

This invention relates generally to space travel and, more particularly, to the selection of spacecraft trajectories and launch modes for interplanetary travel. The velocity at which a spacecraft must be launched from the earth's surface to attain a desired orbit about the earth is well known from principles of orbital mechanics. Similarly, the velocity at which a spacecraft must be launched from earth to reach a desired planetary target along a desired trajectory is also well known. The increment of velocity that has to be imparted to a spacecraft to attain a desired trajectory is often referred to as the $\Delta V$ ("delta V").

Traditionally, spacecraft are placed into a desired trajectory by a multi-stage launch vehicle, the final or upper stage of which increases the velocity of the spacecraft sufficiently to achieve the total $\Delta V$ needed to reach the distant target. The high cost of launching a spacecraft is a major impediment to planetary exploration. Given that the cost of accelerating the spacecraft to the required $\Delta V$ depends on the mass of the spacecraft, there is a practical limit to the spacecraft mass that can be sent to distant planets. One way of increasing this limit is to select a trajectory that takes advantage of the gravity assist of another planetary body. This trajectory is referred to as a planetary "swing-by," but has the disadvantage that the total transfer time is significantly increased in comparison to a more direct trajectory.

Accordingly, there is a need for an alternative approach to the design of interplanetary spacecraft missions, to increase the available payload from a given launch vehicle without increasing the transfer time, or to decrease the transfer time for a given payload. The present invention satisfies this need, as will become apparent from the following description.

SUMMARY OF THE INVENTION

The present invention resides in an interplanetary transfer method comprising the steps of launching a spacecraft as a payload of a multi-stage launch vehicle; accelerating the spacecraft by burning successive stages of the launch vehicle until the spacecraft achieves approximately earth escape velocity; separating the spacecraft from the launch vehicle; and accelerating the spacecraft to a velocity needed to achieve a desired interplanetary transfer trajectory, using an onboard propulsion system. In this method, the upper stage of the launch vehicle is not accelerated into the transfer trajectory and a larger payload can be placed in the transfer trajectory.

The method may also include application to planetary missions that require a substantial delta-V maneuver at destination, such as insertion into a planetary orbit. In this mission class, the need to carry an onboard propulsion system for use at destination is an added incentive for using the same propulsion system at Earth departure. Thus, in accordance with this aspect of the invention, the method includes a preliminary step of using an onboard velocity impulse capability of the spacecraft, based on mission requirements, and further includes applying an additional velocity impulse upon reaching a destination, to achieve a new trajectory with respect to the destination.

In another embodiment of the invention, two separate spacecraft are launched by a single launch vehicle, with an additional velocity impulse applied to each spacecraft, to place them in separate transfer trajectories. In one form of this embodiment, different velocity impulses are applied to each spacecraft, to place them in different trajectories to different destinations. In another form of the method similar velocity impulses are applied to the two spacecraft, to place them in similar trajectories to a common destination, and then an additional velocity impulse is applied to each spacecraft to insert them in different trajectories or orbits at the common destination.

Yet another embodiment of the invention includes the step of applying an additional velocity impulse to the spacecraft near an intermediate target planet, to enable it to reach a much more distant target or to reduce transfer time to its final destination, by taking advantage of the gravity assist provided by the intermediate target planet.

It will be appreciated from this brief summary that the present invention represents a significant advance in the field of space mission planning of interplanetary exploration. Specifically, the invention enables a given launch vehicle to deliver larger payloads into interplanetary trajectories, without increasing the transfer time. Other aspects and advantages of the invention will become apparent from the following more detailed description, taken in conjunction with the drawings.

DESCRIPTION OF THE PREFERRED EMBODIMENT

The present invention provides a way to increase the payload that can be carried to a distant planet using a given launch vehicle, or to decrease the transfer time required to reach a distant planet without reducing the payload. Traditionally, a spacecraft destined for a distant planet has been accelerated to a velocity ($\Delta V$) required to reach the planet by multiple stages of a launch vehicle. Then, without requiring additional propulsion, the spacecraft continues its flight in heliocentric space. When the spacecraft nears its destination, onboard propulsion may be needed to effect a soft landing or to enter into an orbit about the destination planet.

In accordance with the invention, the launch vehicle, including its upper stage, accelerates the spacecraft to a velocity sufficient to escape the earth's gravity. This avoids having to accelerate the launch vehicle upper stage into the same interplanetary transfer trajectory. After separation from the upper stage, the spacecraft itself provides the necessary additional $\Delta V$ to inject it into the desired interplanetary transfer trajectory.

Figure 1:
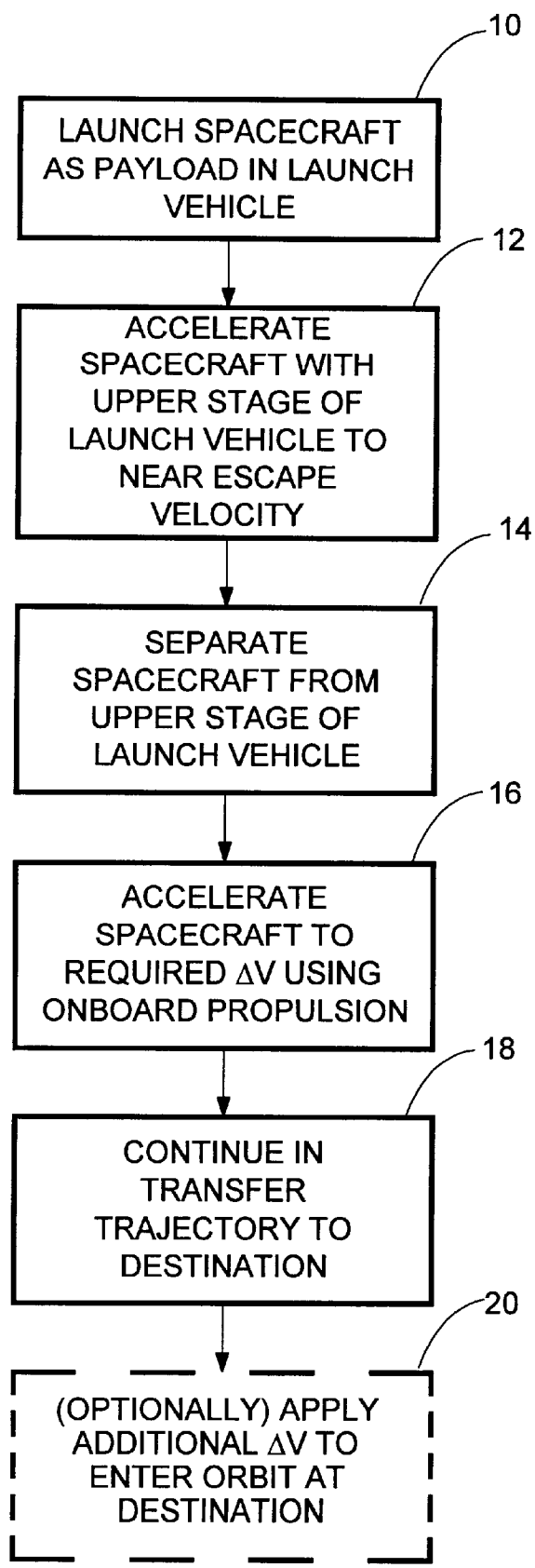
FIG. 1 is a block diagram showing the steps performed in accordance with the invention.

The basic principle of the invention is depicted in the flowchart of FIG. 1. First, as indicated by block 10, the spacecraft is launched as the payload of a conventional multi-stage launch vehicle. As further indicated in block 12, the spacecraft and the upper stage of the launch vehicle are accelerated to a desired velocity, preferably at or slightly less than earth's escape velocity. At this point, the spacecraft is separated from the upper stage of the launch vehicle, as indicated in block 14. The spacecraft is then accelerated to the velocity needed to inject it into the desired transfer trajectory, as indicated in block 16. This phase of acceleration is supplied by the spacecraft's onboard propulsion system. Many spacecraft must carry onboard propulsion for various purposes, anyway, such as for major delta-V maneuvers for orbit change or orbit insertion at the destination planet. In accordance with this critical step in the invention, the spacecraft onboard propulsion system must be adequate to provide acceleration to the required $\Delta V$. This will entail additional propellant storage capacity and possibly more powerful engines. Finally, as indicated in block 18, the spacecraft continues in the transfer trajectory to its destination. Optionally, as indicated in block 20, there may by a further step of applying additional acceleration for purposes of effecting a soft landing or entering into an orbit around the destination planet.

Figure 2:
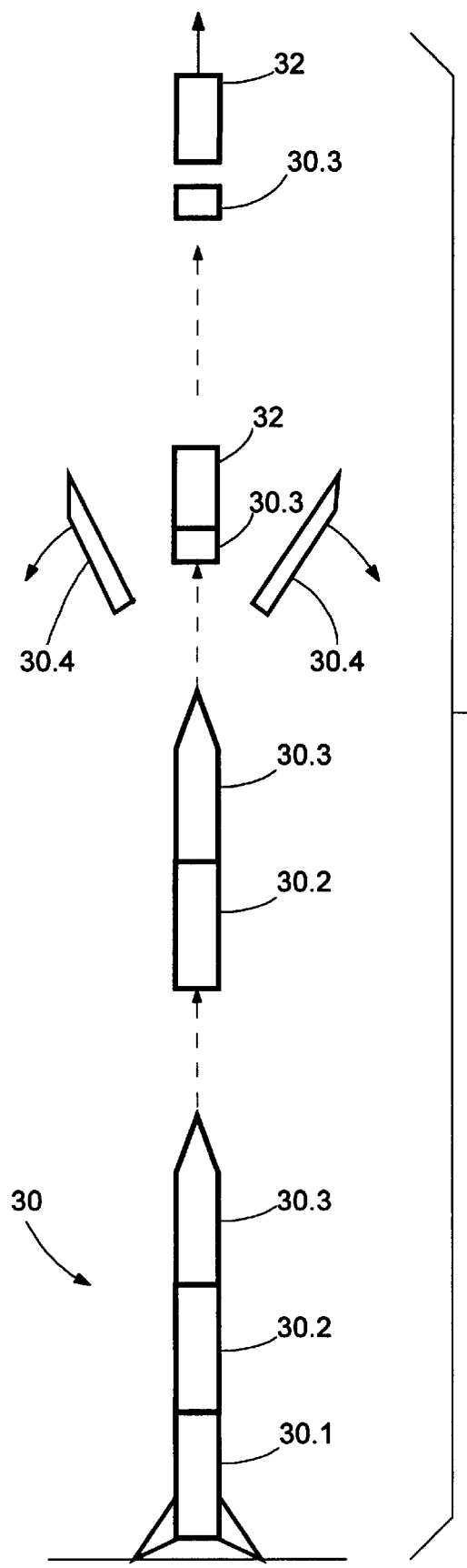
FIG. 2 is diagrammatic view depicting a three-stage launch vehicle as used in accordance with the present invention.

FIG. 2 shows a launch vehicle 30 with three stages 30.1, 30.2 and 30.3, the upper stage having a detachable payload fairing 30.4. After discarding the first two stages, the upper stage 30.3 continues to accelerate to near escape velocity. Then, the payload fairing 30.4 is jettisoned and, as shown at the top of the drawing, a spacecraft 32 separates from the upper stage and continues to accelerate under the power of its own propulsion system, until the departure velocity for the desired transfer trajectory is attained.

Mathematical Basis:

In a conventional launch mode, the ratio of total initial mass to final mass is expressed by:

$$\frac{m_{C,0} + m_s}{m_{C,1} + m_s} = e^{\frac{\Delta V_1}{gI_{sp}}} = r_1,$$

where:

$m_{C,0}$=mass of the conventional launch vehicle and spacecraft payload, but without the dry mass of the upper stage, $m_{C,1}$=mass of the conventional spacecraft payload on reaching its destination, $m_s$=dry mass of the launch vehicle upper stage, g=gravitational acceleration constant, $I_{sp}$=specific impulse of the launch vehicle, $\Delta V_1$=velocity impulse to reach desired transfer trajectory, and $r_1$=initial to final mass ratio.

In the modified launch mode in accordance with the invention, the mass ratio applies now to the initial and final masses of that mode, that is:

$$\frac{m_{M,0}}{m_{M,1}} = r_1,$$

where:

$m_{M,0}$=initial mass of the spacecraft in the modified launch mode, and $m_{M,1}$=final mass of the modified spacecraft in this mode.

With the additional assumption that $m_{M,0} \approx m_{C,0}$, these equations yield an explicit expression for the relative payload mass gain (R) that results from using the modified launch mode of the present invention:

$$R = \frac{m_{M,1}}{m_{C,1}} = \frac{1}{1 - \frac{m_s}{m_{C,0}}(r_1 - 1)}.$$

Figure 3:
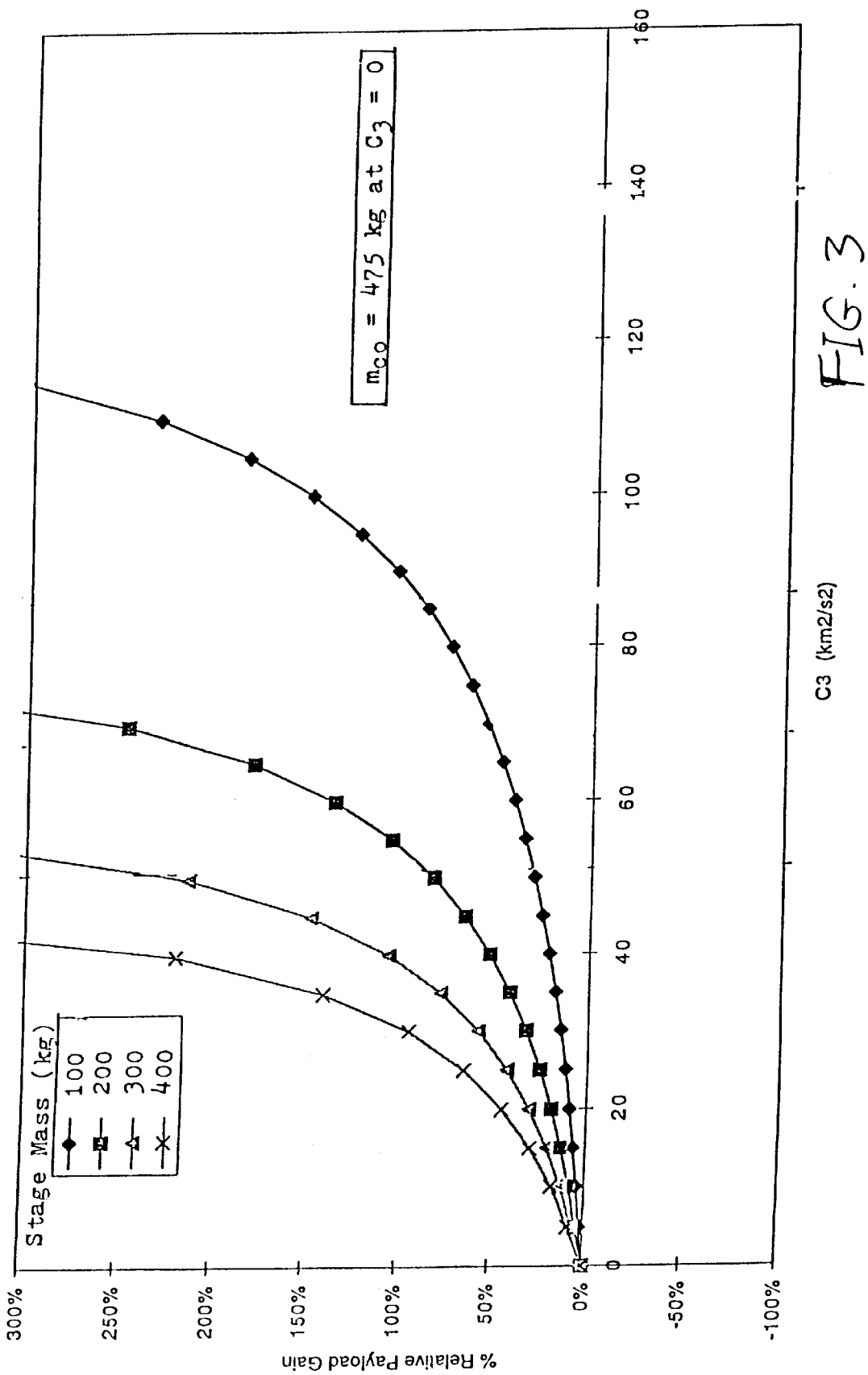
FIG. 3 is a graph depicting the achievable gain in payload mass as a function of required added launch energy ($C_3$), with the eliminated amount of launch vehicle upper stage mass, $m_s$, as a parameter.

FIG. 3 graphically shows the payload gain as a function of launch energy $C_3$, for the Taurus XL/S launch vehicle, with the eliminated amount of upper stage dry mass as a parameter. In each curve of the set of curves shown, the payload gain (R) value would go to infinity at the $r_1$ value given by:

$r_1 = 1 + m_{C,0}/m_s$.

Four curves are shown, for four representative stage masses ranging from 100 kg to 400 kg. Consistent with the above expression for R, for a given mission launch energy $C_3$ the relative payload gain R increases with stage mass.

By way of specific example, for the Taurus XL/S launch vehicle with an upper stage dry mass $m_s$=164 kg, an initial mass $m_{C,0}$=475 kg, and a mass ratio $r_1$=2.863 (for a transfer trajectory to Jupiter), the payload mass gain achieved by the modified launch mode is:

$$R = \frac{1}{1 - \frac{164}{475}(2.863 - 1)} = 2.816,$$

i.e., an approximate 182% increase in payload over the $m_{C,1}$ value of 60 kg. The example assumes that the conventional and modified launch masses are the same, i.e., $m_{C,0} = m_{M,0}$.

The following table provides additional examples of increase in payload mass for two different low-cost launch vehicles (Taurus XL/S and Delta II 7925) and two different mission phases (Jupiter arrival and Jupiter orbit):

| Launch Vehicle | Payload at Jupiter Arrival | | Payload in Jupiter Orbit | |
| --- | --- | --- | --- | --- |
| | Conventional | Modified | Conventional | Modified |
| Taurus XL/S | 60 kg | 169 kg | 46 kg | 130 kg |
| Delta II 7925 | 308 kg | 468 kg | 237 kg | 360 kg |

In general, use of the method of the invention increases the payload mass on high-energy planetary missions by 50%–100%, or more, with no increase in transfer time or mission risk. The achievable payload mass gain depends critically on the launch vehicle upper stage dry mass that is eliminated in the modified launch mode, as indicated above in the expression for R.

For a Jupiter orbit mission, the Taurus XL/S and Delta II 7925 launch vehicles are capable of launching minimum or medium-size orbiter spacecraft using the technique of the invention. Alternatively, the Delta launch vehicle would be capable of launching two orbiters of nearly 180 kg each, simultaneously. Such a mission would provide the additional advantage of providing for simultaneous observations of physical phenomena viewed from two different orbital locations, thereby greatly enhancing the scientific mission yield.

Figure 4:
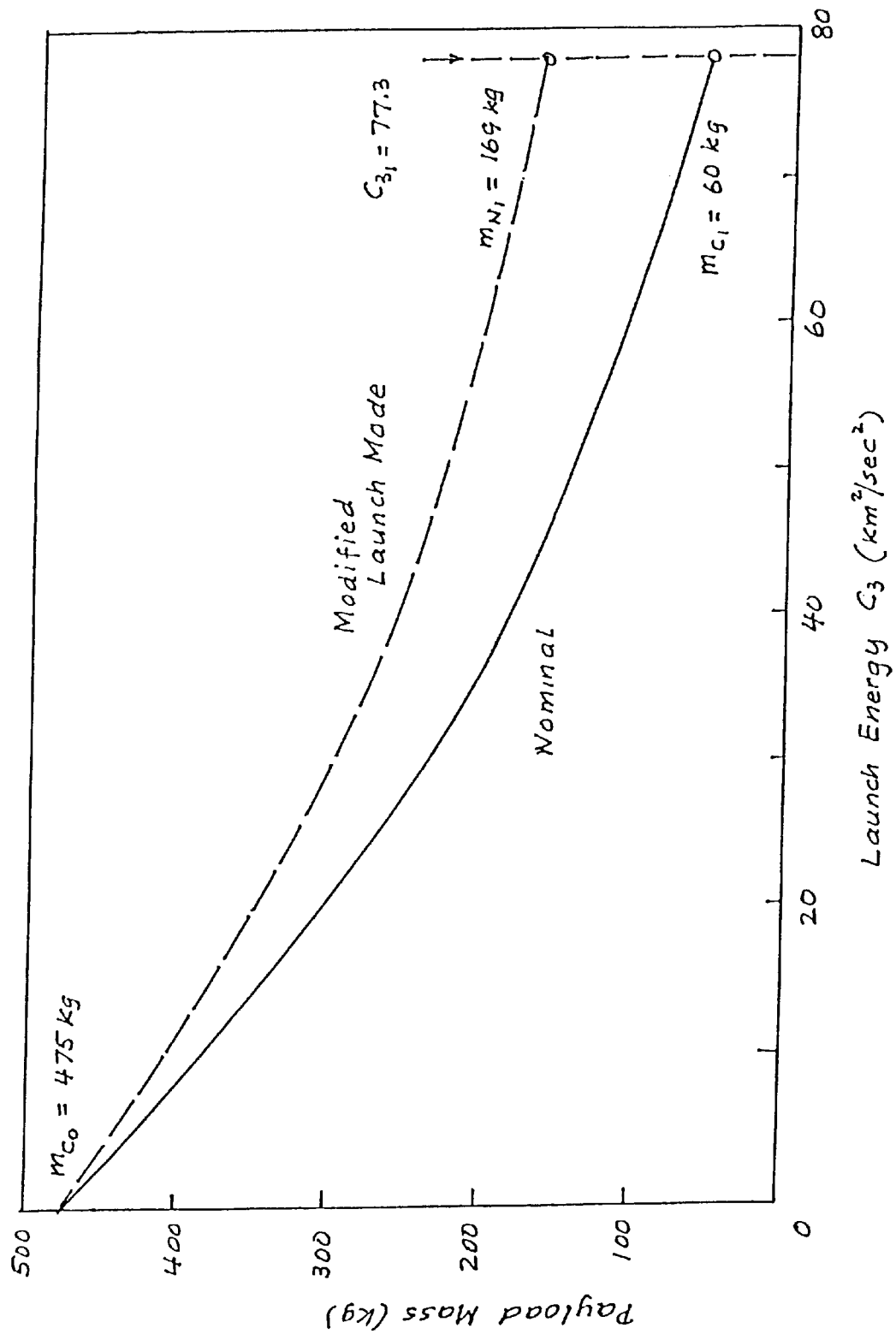
FIG. 4 is a graph comparing the conventional escape mission performance for the Taurus XL/S launch vehicle with its performance using the modified launch mode of the invention.
Figure 5:
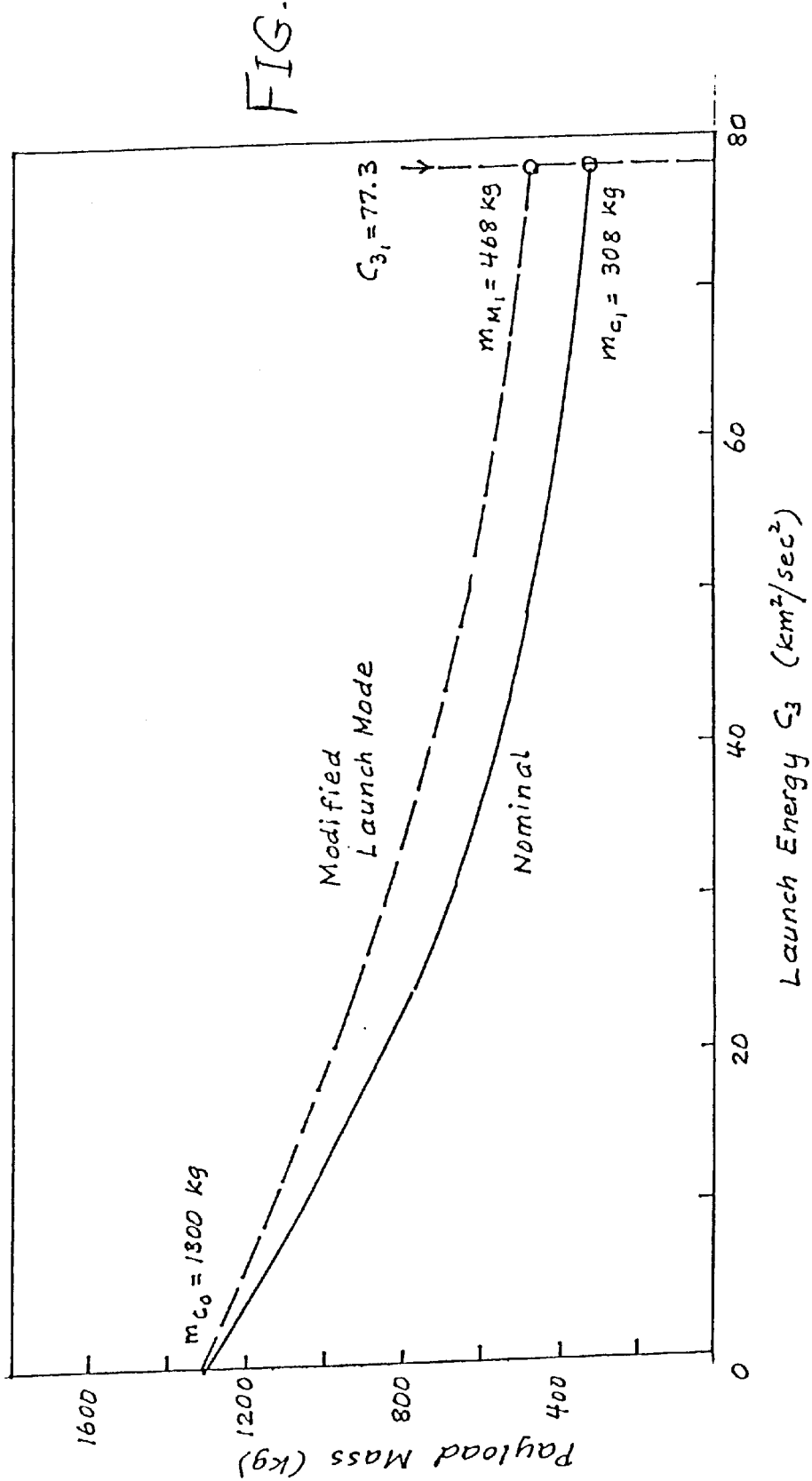
FIG. 5 is a graph similar to FIG. 3, but for a Delta II 7925 launch vehicle.

FIG. 4 is a graph showing the escape mission performance of the Taurus XL/S launch vehicle for both the conventional (lower curve) and modified (upper curve) launch modes. Each curve plots the payload mass (kg) versus launch energy $C_3$ over a range from 0 to nearly 80 km²/sec². ($C_3$ is commonly referred to as the "launch energy." It is defined as the square of the hyperbolic excess velocity $V_\infty$, which characterizes the speed approached asymptotically by a spacecraft moving in a departure trajectory at great distances from Earth.) It will be observed that, consistent with the figures discussed above for this launch vehicle, the payload mass at zero launch energy is 475 kg, and the payload mass reaching destination is 60 kg for the conventional launch mode and 169 kg for the modified launch mode. FIG. 5 is a similar graph for the Delta II 7925 launch vehicle.

Additional aspects and advantages of the invention:

A spacecraft can be designed to provide a velocity impulse (delta V), or the final launch energy $C_3$, in excess of that provided by the launch vehicle. This velocity impulse can be selected in accordance with mission objectives. The optimal delta V will depend on mission requirements, launch vehicle characteristics and accommodation capability for extra onboard propellant. Selection of a delta-V value for a particular mission allows a mission designer to strike a balance between a desired payload mass increase and a transfer time reduction, which is also desired.

As mentioned above, some missions require implementation of a planetary orbiter or lander, which are mission classes that require a substantial propulsion capability at destination. For such missions, the integral propulsion system serves both to augment the Earth departure energy and to perform subsequent propulsion functions during the mission, thereby minimizing additional subsystem mass and developmental costs.

The method of the invention is best suited for high-$C_3$ missions in an outbound or inbound direction, such as to Jupiter, Saturn, Pluto, or to Mercury and solar proximity. High-$C_3$ missions are those, for example, with launch energy requirements much above 30 $km^2/sec^2$. Missions with lower launch energy requirements may be combined with other missions. For example, a Mars mission requiring 15 $km^2/sec^2$ launch energy may be added as a shared mission to one requiring more energy, such as a Jupiter mission, both missions being in the outbound direction.

In one alternative embodiment of the invention, where a shared launch vehicle mode is used, the two spacecraft may reach a common destination but enter different types of orbits, such as polar and equatorial.

In the foregoing description of the invention, it is assumed that the modified launch mode comes into effect beginning at launch energy ($C_3$) of zero, i.e., when the spacecraft has reached escape velocity. This is evident, for example, from FIGS. 4 and 5, both of which show the benefit of the modified launch mode especially for high $C_3$ values. The invention may also be used, however, starting with launch energy values somewhat higher than zero. Thus, the launch vehicle may be used to accelerate the vehicle and payload to a launch energy near zero, corresponding to a velocity slightly below, equal to, or above escape velocity, and then the onboard propulsion system provides the additional velocity impulse needed to complete the mission. If this aspect of the invention were to be illustrated in the same manner as in FIGS. 4 and 5, the modified and conventional launch mode curves would not begin diverging until some higher level of launch energy is reached, and a lower payload gain would be achieved. Launching at a $C_3$ value greater than zero saves onboard propellant, which may be preferred if the smaller payload mass reaching destination meets the mission objectives.

In accordance with another important aspect of the invention, the same onboard propulsion system used to add a velocity impulse on departure from Earth is also used to provide an additional velocity impulse near an intermediate destination planet in a "powered swing-by" encounter. Use of the powered swing-by reduces the transfer time to distant planets, such as Pluto. For example, a ten-year fast Pluto mission can be achieved with a moderate-size launch vehicle via a powered swing-by of Jupiter, but without the complexity of multiple additional swing-bys of other planets. The powered swing-by greatly increases the effectiveness of the gravity assist provided by Jupiter, as compared with a passive swing-by in which no propulsion is used.

In principle, the application of the required velocity impulse must be achieved within a reasonably short time interval to minimize the delta-V penalty inherent in gaining altitude during the propulsion phase. If the onboard-propulsion thrust level is made sufficiently large so as to finish the thrust phase within less than 8–10 minutes, this penalty can be limited to a range of 4–8 percent. This is a relatively small penalty compared with the overall payload gain ranging from 50–100 percent. Specific details must be determined in relation to the total energy requirement of the intended deep-space mission, such that the initial thrust acceleration is at least 0.5 g, or 5 $m/sec^2$.

In summary, the present invention provides a significant increase in planetary mission payload for a given launch vehicle without increasing transfer time. Alternatively, the invention also permits a reduction in interplanetary transfer time without affecting the achievable payload mass. It will be appreciated that, although specific examples have been provided by way of illustration, various modifications may be made without departing from the spirit and scope of the invention. Accordingly, the invention should not be limited except as by the appended claims.

What is claimed is:

1. A method for achieving an interplanetary spacecraft trajectory, comprising the steps of:

launching at least one spacecraft as a payload of a multi-stage launch vehicle;

accelerating the spacecraft by burning successive stages of the launch vehicle until the spacecraft and an upper stage of the launch vehicle achieve at least approximately earth escape velocity;

separating the spacecraft from the upper stage of the launch vehicle; and accelerating the spacecraft with a velocity impulse needed to achieve a desired interplanetary transfer trajectory, using an onboard propulsion system, whereby no expendable or reusable rocket stage is accelerated into the same transfer trajectory, and a larger payload is placed in the transfer trajectory in comparison with the payload of a spacecraft that uses an expendable or reusable rocket stage to achieve the transfer trajectory.

2. A method as defined in claim 1, and further comprising the step of using an onboard velocity impulse capability of the spacecraft at least once subsequent to its use in the accelerating step, based on mission requirements.

3. A method as defined in claim 1 or 2, and further comprising the steps of:

applying an additional velocity impulse upon reaching a final destination, as required to change the trajectory with respect to the destination.

4. A method as defined in claim 3, wherein:

the launching step includes launching two spacecraft by a single launch vehicle; and the step of applying an additional velocity impulse includes applying different velocity impulses to the two spacecraft, to place them in different trajectories at destination.

5. A method as defined in claim 3, wherein:

the launching step includes launching two spacecraft by a single launch vehicle; and the step of accelerating the spacecraft with a velocity impulse includes applying different velocity impulses to the two spacecraft, to place them in different trajectories to different destinations.

6. A method as defined in claim 3, wherein:

the launching step includes launching two spacecraft by a single launch vehicle; and the step of accelerating the spacecraft with a velocity impulse includes applying similar velocity impulses to the two spacecraft, to place them in similar trajectories to a common destination, and the step of applying an additional velocity impulse includes applying an additional velocity impulse to each of the two spacecraft, to place them in different trajectories at the common destination.

7. A method as defined in claim 3, and further comprising the steps of:

applying an additional velocity impulse to the spacecraft near an intermediate target planet, to achieve a selected combination of reaching a more distant final destination and reducing transfer time taken to reach the final destination, using a powered swing-by maneuver that takes advantage of and enhances gravity-assist effects provided by the intermediate target planet.

* * * * *